United States Patent
Swann

[19]

[11] Patent Number: 5,911,433
[45] Date of Patent: Jun. 15, 1999

[54] VEHICLE OCCUPANT PROTECTION APPARATUS

[75] Inventor: Timothy A. Swann, Mesa, Ariz.

[73] Assignee: TRW Inc., Lyndhurst, Ohio

[21] Appl. No.: 08/965,510

[22] Filed: Nov. 6, 1997

[51] Int. Cl.$^6$ .......................... B60R 21/22; B60R 22/46
[52] U.S. Cl. ........................ 280/730.2; 280/806
[58] Field of Search .............. 280/730.1, 730.2, 280/737, 741, 806, 733

[56] References Cited

U.S. PATENT DOCUMENTS

| | | |
|---|---|---|
| 4,513,629 | 4/1985 | Keller et al. . |
| 5,213,362 | 5/1993 | Coultas . |
| 5,301,772 | 4/1994 | Honda . |
| 5,350,194 | 9/1994 | Fohl . |
| 5,413,378 | 5/1995 | Steffens, Jr. et al. . |
| 5,454,592 | 10/1995 | Blumenthal et al. . |
| 5,496,061 | 3/1996 | Brown . |
| 5,496,068 | 3/1996 | Ball et al. . |
| 5,531,479 | 7/1996 | Bauer . |
| 5,704,638 | 1/1998 | Lane ...................................... 280/730.2 |

*Primary Examiner*—Paul N. Dickson
*Attorney, Agent, or Firm*—Tarolli, Sundheim, Covell, Tummino & Szabo

[57] ABSTRACT

An apparatus (10) includes a first vehicle occupant protection apparatus (22), a second vehicle occupant protection apparatus (44), and an actuating device (46). The first protection apparatus (22), when actuated, helps to protect an occupant of a vehicle seat (16). The second protection apparatus (44), when actuated, also helps to protect the occupant of the seat (16). The first protection apparatus (22) comprises a seat belt pretensioner including a piston (70) supported for movement through a pretensioning stroke. The actuating device (46) responds to movement of the piston (70) through the pretensioning stroke by actuating the second protection apparatus (44).

8 Claims, 2 Drawing Sheets

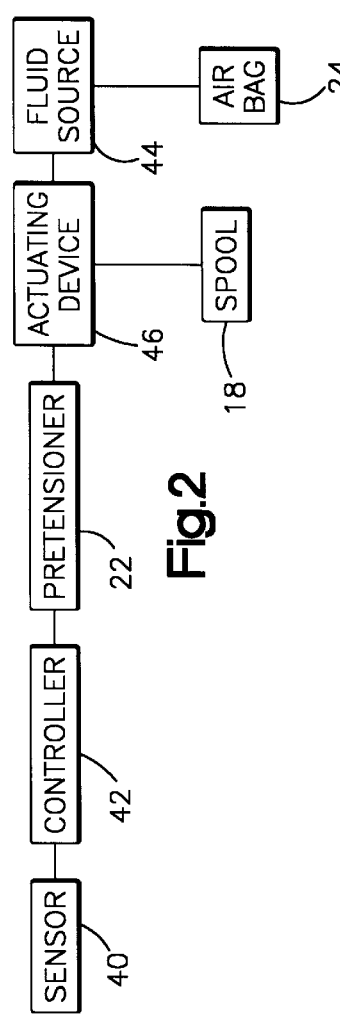
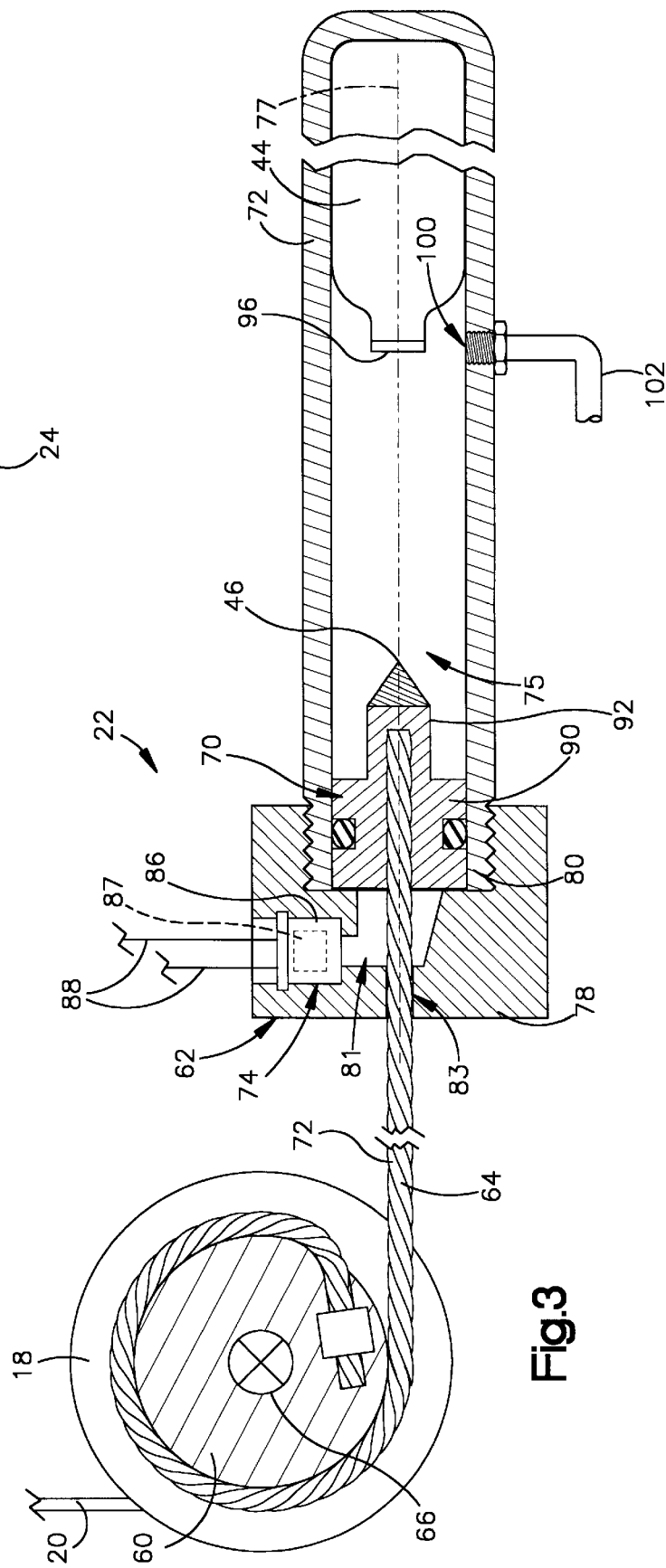

VEHICLE OCCUPANT PROTECTION APPARATUS

FIELD OF THE INVENTION

The present invention relates to an apparatus for protecting a vehicle occupant, and particularly relates to an apparatus including a seat belt pretensioner and an inflatable vehicle occupant protection device.

BACKGROUND OF THE INVENTION

A seat belt pretensioner is a device that is used with seat belt webbing to help protect a vehicle occupant upon the occurrence of a vehicle crash. When the pretensioner is actuated, it imparts tension to the webbing to help ensure that the webbing restrains movement of the vehicle occupant.

An inflatable device also may be used to help protect the vehicle occupant. One particular type of inflatable vehicle occupant protection device is known as an air bag. Other inflatable vehicle occupant protection devices include, for example, inflatable seat belts, inflatable knee bolsters, inflatable headliners or side curtains, and knee bolsters operated by inflatable air bags. Each of these devices is inflated by fluid received from a source which is actuated upon the occurrence of a vehicle crash.

A pretensioner and an inflatable vehicle occupant protection device are typically included in a system which further includes a crash sensor and a controller. The crash sensor senses the occurrence and the severity of a vehicle crash. The crash severity may be great enough for both the pretensioner and the inflatable device to be used for protection of the vehicle occupant. If so, the controller responds by providing the pretensioner with an electrical actuation signal, and also by providing the source of inflation fluid with an electrical actuation signal.

SUMMARY OF THE INVENTION

In accordance with the present invention, an apparatus comprises a first vehicle occupant protection apparatus, a second vehicle occupant protection apparatus, and an actuating device. The first protection apparatus, when actuated, helps to protect an occupant of a vehicle seat. The second protection apparatus, when actuated, also helps to protect the occupant of the seat.

The first protection apparatus comprises a seat belt pretensioner which includes a piston supported for movement through a pretensioning stroke. The actuating device responds to movement of the piston through the pretensioning stroke by actuating the second protection apparatus.

In a preferred embodiment of the present invention, the second protection apparatus comprises a tank storing pressurized inflation fluid for an air bag. The tank has a rupturable closure wall. The actuating device is mounted on the piston in the pretensioner. When the pretensioner is actuated, the actuating device moves with the piston through the pretensioning stroke. The actuating device is then moved forcefully against the closure wall to rupture the closure wall and thereby to release the inflation fluid from the tank.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 2 is a block diagram of parts of the first embodiment;

FIG. 3 is an enlarged, partly schematic view showing parts of the first embodiment in somewhat greater detail;

DESCRIPTION OF PREFERRED EMBODIMENTS

Figure 1:
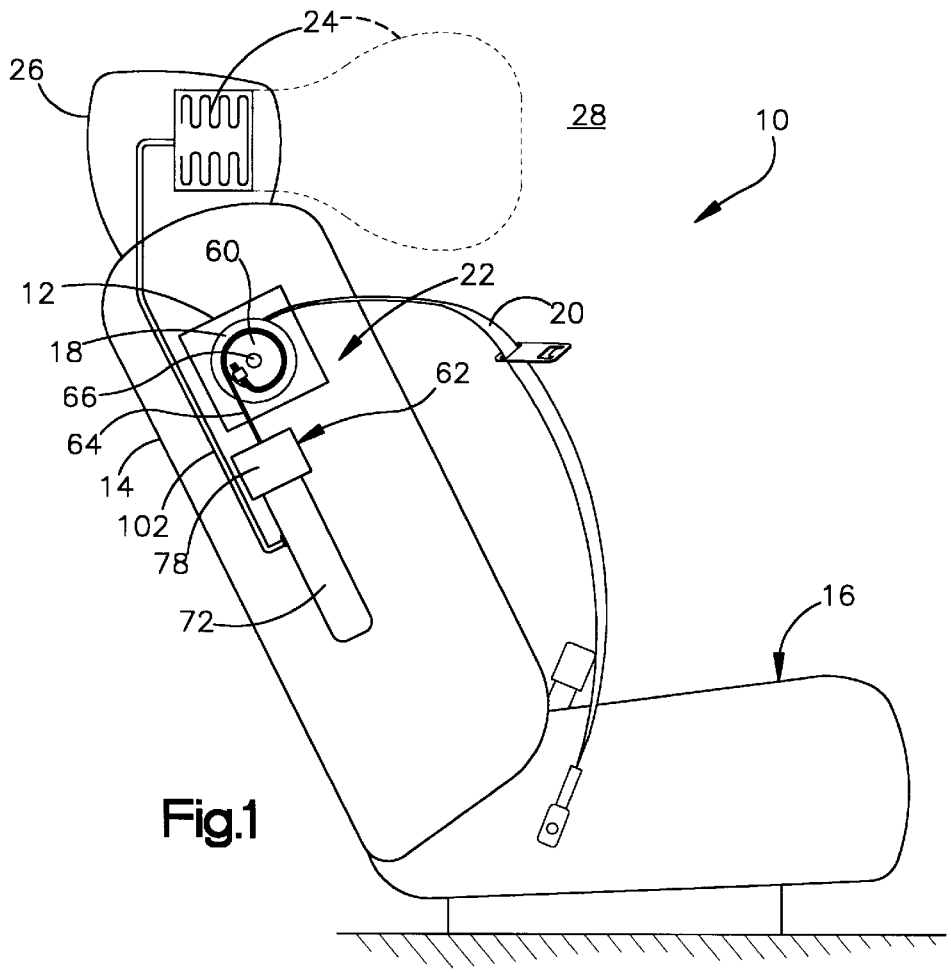
FIG. 1 is a schematic view of parts of a first embodiment of the present invention.

An apparatus 10 comprising a first embodiment of the present invention is shown in partially in FIG. 1. The apparatus 10 includes a seat belt retractor 12 which is mounted on a back portion 14 of a vehicle seat 16. The retractor 12 has a spool 18 for winding and unwinding seat belt webbing 20. The apparatus 10 further includes a seat belt pretensioner 22 and an inflatable vehicle occupant protection device 24.

The pretensioner 22 is mounted on the seat back 14 beneath the retractor 12. When the pretensioner 22 is actuated, it rotates the spool 18 in the winding direction. This pulls the webbing 20 more tightly against an occupant of the seat 16, and thus imparts tension to the webbing 20 to help the webbing 20 restrain the occupant.

The inflatable device 24, which is commonly referred to as an air bag, is mounted in a headrest portion 26 of the seat 16. The air bag 24 is inflatable from a stored, folded condition, as shown in solid lines, to an unfolded, inflated condition, as shown in dashed lines. When the air bag 24 is inflated, it helps protect the occupant's head from a forceful impact with a side portion of the vehicle.

As shown in the block diagram of FIG. 2, the apparatus 10 further includes a crash sensor 40 and a controller 42. The sensor 40 is a known device that senses a vehicle condition indicating the occurrence of a crash. Such a crash-indicating condition may comprise, for example, sudden deceleration of the vehicle, sudden transverse acceleration of the vehicle, and/or crushing of a door or other side portion of the vehicle. If the sensor 40 senses a crash-indicating condition that is at or above a predetermined threshold level, it provides the controller 42 with a crash signal indicating the occurrence of a crash having at least a predetermined threshold level of severity. The controller 42, which may comprise a microprocessor of known construction, responds to the crash signal by actuating the pretensioner 22. The pretensioner 22 then rotates the retractor spool 18 in the winding direction.

As further shown in the block diagram of FIG. 2, the air bag 24 has a source 44 of inflation fluid. An actuating device 46 is operatively interposed between the pretensioner 22 and the source 44 of the inflation fluid. When the pretensioner 22 is actuated by the controller 42, the actuating device 46 responds to the pretensioner 22 by actuating the fluid source 44. The fluid source 44 then provides inflation fluid which inflates the air bag 24.

As shown in greater detail in FIG. 3, the pretensioner 22 includes a pulley 60 and a piston/cylinder assembly 62. The pulley 60 is mounted on the retractor spool 18. A cable 64 extends from the pulley 60 to the piston/cylinder assembly 62. A rotatable coupling 66 supports the pulley 60 on the spool 18 in a known manner such that the spool 18 normally rotates relative to the pulley 60 for winding and unwinding of the webbing 20 on the spool 18. However, if the pulley 60 rotates in the winding direction, which is counterclockwise as viewed in FIG. 3, the coupling 66 causes the spool 18 to rotate with the pulley 60 in the winding direction.

The piston/cylinder assembly 62 includes a piston 70, a cylinder 72, and an initiator 74. The cylinder 72 defines a bore 75 in which the piston 70 is supported for movement along a longitudinal central axis 77. A closure cap 78 is screwed onto an open end portion 80 of the cylinder 72. The closure cap 78 defines a chamber 81 communicating the initiator 74 with the piston 70. The cable 64 is fixed to the piston 70, and extends outward from the piston/cylinder assembly 62 through a passage 83 at the center of the closure cap 78.

The initiator 74 is an electrically actuatable device which is commonly referred to as a squib. The initiator 74 thus has a cylindrical casing 86 containing a small charge 87 of pyrotechnic material. A pair of electrical leads 88 project from the casing 86. When the controller 42 receives the crash signal from the sensor 40, as described above with reference to FIG. 2, it directs electric current through the initiator 74 between the leads 88. This causes the charge 87 of pyrotechnic material to ignite and produce combustion products which are spewed from the casing 86 into the chamber 81. The combustion products in the chamber 81 develop a thrust which moves the piston 70 axially inward of the bore 75, i.e., from left to right as viewed in FIG. 3. The piston 70 then pulls the cable 64 so as to rotate the pulley 60 and the retractor spool 18 in the winding direction.

As further shown in FIG. 3, the piston 70 has a cylindrical body 90. A reduced-diameter neck 92 of the piston 70 projects axially inward from the body 90. The actuating device 46, which is shown schematically in FIG. 2, is a conical part mounted coaxially on the piston 70 at the inner end of the neck 92. The source 44 of inflation fluid, which also is shown schematically in FIG. 2, is a cylindrical tank storing inflation fluid under pressure. The tank 46 is received in the cylinder 72, and has a rupturable closure wall 96 facing outward along the axis 77 at a location spaced from the actuating device 46.

When the piston 70 is moved axially inward of the bore 75 upon actuation of the pretensioner 22, the actuating device 46 on the piston 70 moves toward and against the closure wall 96 on the tank 44. The actuating device 46 then ruptures the closure wall 96 to release the inflation fluid from the tank 44. The inflation fluid flows outward from the tank 44 into the bore 75, outward from the bore 75 through an aperture 100 at the side of the cylinder 72, and further outward from the aperture 100 to the air bag 24 through a conduit 102.

In accordance with a particular feature of the present invention, the closure wall 96 on the tank 44 is spaced a predetermined distance axially from the actuating device 46 on the piston 70. The tank 44 stops movement of the piston 70 upon movement of the actuating device 46 against the closure wall 96. The tank 44 thus limits movement of the piston 70 to a predetermined pretensioning stroke which is approximately equal to the distance at which the closure wall 96 is spaced axially from the actuating device 46.

Figure 4:
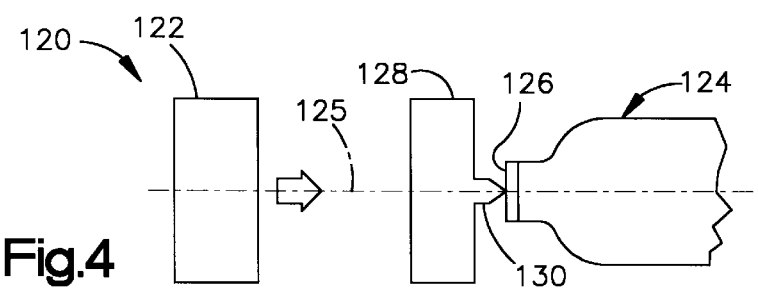
FIG. 4 is a schematic view of parts of a second embodiment of the present invention.

An apparatus 120 comprising a second embodiment of the present invention is shown partially in FIG. 4. Like the apparatus 10 described above, the apparatus 120 includes a pretensioner piston 122 and a source 124 of inflation fluid. The piston 122 is movable along an axis 125 in the same manner as described above with reference to movement of the piston 70 along the axis 77. The source 124 of inflation fluid is a tank with a rupturable closure wall 126 facing axially toward the piston 122 at a location spaced from the piston 122.

The apparatus 120 further includes an actuating device 128. However, unlike the actuating device 46 in the apparatus 10 described above, the actuating device 128 in the apparatus 120 is separate from the corresponding piston 122. More specifically, the actuating device 128 is spaced from the piston 122 along the axis 125, and has an opener portion 130 adjoining the closure wall 126 on the tank 124. As the piston 122 approaches the end of a predetermined pretensioning stroke, it moves forcefully into contact with the actuating device 128. The piston 122 then moves the actuating device 128 a short distance along the axis 125 from left to right, as viewed in FIG. 4, as the piston 122 completes the pretensioning stroke. This causes the opener portion 130 of the actuating device 128 to rupture the closure wall 126 and thereby to release pressurized inflation fluid from the tank 124.

Figure 5:
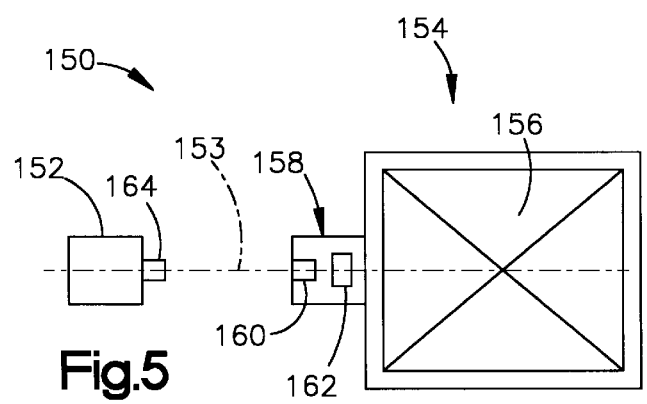
FIG. 5 is a schematic view of parts of a third embodiment of the present invention.

An apparatus 150 comprising a third embodiment of the present invention is shown partially in FIG. 5. The apparatus 150 also includes a pretensioner piston 152 which is movable along an axis 153 in the same manner as described above with reference to movement of the piston 70 along the axis 77. However, the apparatus 150 includes a source 154 of inflation fluid which differs from the source 44 described above. Specifically, the source 154 of inflation fluid in the apparatus 150 comprises a body 156 of ignitable gas generating material, and further comprises an igniter 158 for igniting the body 156 of gas generating material.

The igniter 158 includes a percussion primer 160 and a small charge 162 of pyrotechnic material. The pyrotechnic material of which the charge 162 is formed, as well as the gas generating material of which the body 156 is formed, may have any suitable composition and configuration known in the art. The percussion primer 160 is a known device which is actuatable upon the application of force to the percussion primer 160.

As shown schematically in FIG. 5, the igniter 158 is located in the path of movement of an actuating device 164 which is mounted on the piston 152. As the piston 152 approaches the end of a predetermined pretensioning stroke, the actuating device 164 moves forcefully into contact with the igniter 158. The impact of the actuating device 164 moving against the igniter 158 actuates the percussion primer 160. The percussion primer 160 then ignites the charge 162 of pyrotechnic material which, in turn, ignites the body 156 of gas generating material. A large volume of inflation gas is then generated upon combustion of the body 156 of gas generating material.

The invention has been described with reference to preferred embodiments. From the foregoing description of the invention, those skilled in the art will perceive improvements, changes and modifications. For example, the actuating device 46 in the first embodiment, as well as the actuating device 164 in the third embodiment, is a separate part that is mounted on the corresponding piston. However, such an actuating device could alternatively be constructed as a portion of a one-piece structure comprising both the actuating device and the piston. Moreover, a pretensioner constructed in accordance with the present invention could be connected to a seat belt buckle rather than a seat belt retractor spool, or could pull the webbing directly by clamping against the webbing. Such improvements, changes and modifications within the skill the of the art are intended to be covered by the appended claims.

Having described the invention, the following is claimed:

1. Apparatus comprising:

a first vehicle occupant protection apparatus which, when actuated, helps to protect an occupant of a vehicle seat, said first protection apparatus comprising a seat belt pretensioner including a piston supported for movement through a pretensioning stroke;

a second vehicle occupant protection apparatus which, when actuated, helps to protect said occupant; and a device which responds to movement of said piston through said pretensioning stroke by actuating said second protection apparatus.

2. Apparatus as defined in claim 1 wherein said second protection apparatus, when actuated, provides inflation fluid for inflating a vehicle occupant protection device.

3. Apparatus as defined in claim 1 wherein said second protection apparatus defines the length of said pretensioning stroke by blocking movement of said piston beyond said pretensioning stroke.

4. Apparatus comprising:

a seat belt pretensioner which, when actuated, imparts tension to seat belt webbing;

a source of inflation fluid which, when actuated, provides inflation fluid for inflating a vehicle occupant protection device; and a device which responds to actuation of said pretensioner by actuating said source of inflation fluid.

5. Apparatus as defined in claim 4 wherein said actuating device is movable with a piston in said pretensioner, said source of inflation fluid comprising a structure located in the path of movement of said actuating device and being actuatable upon movement of said actuating device against said structure.

6. Apparatus as defined in claim 5 wherein said actuating device is mounted on said piston for movement with said piston toward and into contact with said structure upon movement of said piston through a pretensioning stroke.

7. Apparatus as defined in claim 5 wherein said structure is a closure wall of a pressure vessel containing inflation fluid, said closure wall being rupturable under the force of said actuating device moving against said closure wall.

8. Apparatus as defined in claim 5 wherein said structure is an igniter comprising a percussion primer which is actuatable under the force of said actuating device moving against said percussion primer.

* * * * *